United States Patent Office 3,480,437
Patented Nov. 25, 1969

3,480,437
TWO COMPONENT DIAZO SENSITIZING COMPOSITIONS CONTAINING A XANTHINE COMPOUND
Chester E. Slimowicz, Vestal, N.Y., assignor to GAF Corporation, a corporation of Delaware
No Drawing. Filed Nov. 30, 1965, Ser. No. 510,669
Int. Cl. G03c *1/58, 5/34*
U.S. Cl. 96—91   10 Claims

ABSTRACT OF THE DISCLOSURE

A two-component, light-sensitive diazotype sensitizing composition comprising an azo dye coupling component, a xanthine compound and a diazo derivative of a para-phenylene diamine, which yields, on alkaline development, a pure blue to blue-green dye-stuff image in the non-exposed areas.

---

The present invention relates in general to the production of light-sensitive diazotype photoprinting materials and more particularly to sensitizing compositions useful in preparing same.

As is well known, the manufacture of light-sensitive diazotype materials involves the application to a suitable base of a sensitizing solution comprising one or more stabilized light-sensitive diazonium compounds. The latter are characterized in that upon exposure to actinic radiation they undergo a photolytically induced decomposition being thus rendered incapable of coupling with an azo dye coupling component. In the processing of such materials they are exposed to light under a pattern, e.g., photographic transparency, line drawing or the like, whereby the light-sensitive diazonium compound is decomposed imagewise in accordance with the light transmitted by the pattern. In the case of two-component diazotype materials, i.e., where one or more coupling components as well as suitable stabilizers against precoupling are incorporated into the sensitizing composition, a positive dye image is formed by subjecting the element thus exposed to an alkaline environment, preferably an ammonia atmosphere, to initiate the coupling reaction by the undecomposed diazonium and coupler.

Two-component diazotype materials are in general preferred since the requirement for the use of an aqueous, coupler-containing developer composition is obviated. This, of course, presents several processing advantages including, for example, the elimination of the manifold problems associated with loss of sensitizing component, stabilizer, etc., via diffusion into the aqueous developer solution. Accordingly, the two-component process makes possible the obtention of reproductions characterized by superior dye density, brightness, image quality and the like.

Despite the extensive commercial adoption of the aforedescribed process, considerable difficulty has nevertheless been encountered in connection with attempts to provide diazo-coupler systems capable of yielding blue dyestuffs having the requisite coloration for satisfactory "blueprint" type reproduction.

As has been recognized, the blue color obtainable in the latter process displays a pronounced greenish hue, i.e., is characteristically more minus red than its diazotype counterpart. The inevitable conditioned visual appeal which has developed over the years for the "green-blues" typical of blueprint photo reproduction has proved to be a rather serious deterrent to any significant exploitation of the diazotype process as a suitable alternative thereto. The constant search for diazo-coupling systems capable of yielding dyestuff products possessed of color, hue, saturation, etc., closely approximating blueprint-blues has continued to perplex diazotype technology.

Despite the considerable industrial effort in this regard, the results heretofore obtained have provided in the main but marginal improvement. In the vast majority of instances, the dyestuff images obtainable with the diazo/coupler systems thus far promulgated, invariably depart in spectral characteristics from the desired greenish-blue hues whether in the form of an overall reddish tint or other spurious coloration. Resort to a variety of other remedial techniques such as those involving the addition of one or more stabilizers, solubilizing synergists and the like to the diazo-coupler composition have likewise failed to abate, to any significant extent, the aforementioned difficulties.

The problem of achieving the desired blueprint-blue shades in diazotype reproduction has proved to be particularly manifest with two-component diazo sensitizing compositions wherein the diazo component comprises a diazo derivative of a paraphenylene diamine of the following general formula:

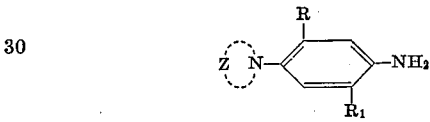

wherein Z represents the non-metallic atoms necessary to complete a heterocyclic nucleus selected from the group consisting of morpholine, thiomorpholine, piperidine and piperazine, and R and $R_1$ independently represent hydrogen, lower alkoxy containing from 1 to 4 carbon atoms, e.g., ethoxy, butoxy, etc., or lower alkyl, e.g., methyl, ethyl, propyl, etc. Diazo derivatives of compounds encompassed by the above formula have heretofore constitued a particularly preferred class of compounds for use in diazotype photoreproduction, since aside from the fact that the blue copy obtainable therewith bears a reasonable resemblance to blueprint copy, such compounds possess other beneficial properties including a relatively high order of coupling activity as well as high degree of light-sensitivity and relatively limited water solubility. The latter property is a particularly desirable one since problems associated with loss of sensitizer by running or bleeding in the presence of hydrophilic environments are eliminated.

Despite the manifold advantages inherent in their use, prior attempts to exploit the aforedescribed diazo derivatives in the production of blueprint-blues have nevertheless failed to satisfy commercial requirements, the primary objection being again the fugitive color tints, and especially red, characterizing their dyestuff products.

Thus, a primary object of the present invention resides in the provision of two-component diazo sensitizing compositions in which the foregoing and related disadvantages are eliminated or at least mitigated to a substantial extent.

Another object of the present invention resides in the provision of two-component diazo sensitizing compositions which yield, upon alkaline development, blue to blue-green dyestuffs substantially devoid of spurious color tints.

A further object of the present invention resides in the provision of relatively high speed two-component diazo sensitizing compositions which can be effectively utilized for the production of photo copies substantially identical in color composition with those obtained in the so-called "blueprint" process, said copies being characterized by exceptional purity of color, hue, saturation, contrast and the like.

The attainment of the foregoing and related objects is made possible in accordance with the present invention which in its broader aspects is based upon the discovery that xanthine compounds function as "greening" agents when incorporated into certain two-component diazotype formula capable of yielding bluish dyestuff products and more particularly those containing in addition to the azo coupling component, a light-sensitive diazo derivative of a compound of the following formula:

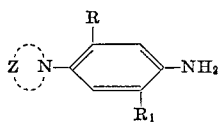

wherein R, $R_1$ and Z have the significance given above. It will be further understood that one or more of the ring atoms of the heterocycle may contain additional, inert C-bonded and/or N-bonded substituents such as alkyl, acyl, phenyl and the like.

In accordance with the discovery forming the basis of the present invention it has been found that the reddish tint which normally characterizes the blue dyestuffs obtained with coupling systems based upon the use of the particular class of diazo derivatives formulistically depicted above, is completely eliminated in favor of a pronounced shift towards green. Regardless of the theory which might be postulated in explanation of the foregoing, and however state, the results observed would appear to indicate a net increase in the absorption of the dyestuff in the red spectral radiation with a corresponding net decrease in its absorptivity for the green spectral radiation.

Dyestuff images obtained with the diazo sensitizing compositions modified in accordance with the present invention display not only an exceptionally pure blue-green hue but in addition, yield reproductions characterized by outstanding brightness, contrast, color saturation and the like. Such considerations are, of course, of paramount importance in connection with the photocopying of certain information such as highly detailed drawings wherein accuracy of reproduction as well as facility of visual comprehension are critical objectives.

The xanthine compounds found to be eminently suitable for use in the compositions provided by the present invention, include for example, caffeine, theophylline, theobromine and the like; caffeine appears to be a particularly effective compound since it possesses a relatively high activity, i.e., "greening" effect. The concentration of the xanthine is critical solely from the standpoint of its being present in amounts sufficient to impart the desired greening effects. In general, it is found that such results can be assured by utilizing the xanthine compound in amounts ranging from about 0.5% to about 2.5% by weight based on the total weight of the sensitizing solution with a range of from about 1% to about 2% being preferred. Within the foregoing limitations, optimum concentrations can be readily ascertained in a particular instance by routine laboratory investigation and will, of course, be influenced, by such factors as the nature of the diazo/coupler system employed. Moreover, the xanthine compound may be advantageously used in admixture comprising two or more of such compounds.

As indicated hereinbefore, the diazo sensitizing compositions contemplated by the present invention comprise as essential addenda a xanthine compound, a diazo derivative of a compound encompassed by the above illustrated formula and an azo coupling component, said compositions forming upon alkaline development a blue to blue-green image. The coupling components suitable for use herein are well known in the art and may be selected from a wide variety of materials. Although no particular criticality attaches to the selection thereof, particularly beneficial results are found to obtain with the beta-naphthoic acid amides such as the sulfonic acid substituted derivatives thereof, the dihydroxynaphthalene sulfonic acids, e.g., the 1,8-dihydroxynaphthalene sulfonic acids and the amino-substituted hydroxynaphthalene sulfonic acids, e.g., 1-hydroxy-8-aminonaphthalene-2-sulfonic acid. Couplers of the foregoing types are extensively described in diazo sensitizer relationships in both the patent and trade literature.

As examples of couplers of the beta-naphthoic acid amide type, specific mention may be made of those compounds corresponding to the following structural formula:

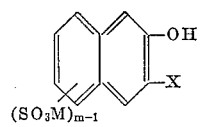

wherein $m$ is an integer of 1, 2 or 3; M represents hydrogen or a water-solubilizing cation and X represents —OH or

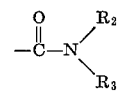

with the provision that when X is —OH, $m$ is at least 2 and wherein $R_2$ represents hydrogen, alkyl and preferably lower alkyl of from 1 to 4 carbon atoms, e.g., methyl, ethyl, propyl, etc.; hydroxy lower alkyl, e.g., 2-hydroxyethyl, 2,3-dihydroxypropyl and $R_3$ represents hydrogen, lower alkyl, hydroxy lower alkyl, e.g., 2-hydroxyethyl, tris-(hydroxymethyl) methyl, aminoalkyl, e.g., N,N-diethylaminoethyl; N,N-dipropylaminoethyl; N-morpholinopropyl; etc.

Specific representatives of the foregoing class of compounds include without limitation the following:

2-hydroxy-3-(N-morpholinopropyl)naphthamide
2,3-dihydroxy-6-sulfonic acid
2,3-dihydroxy-6-sulfonic acid sodium salt
2,3-dihydroxy-5-sulfonic acid sodium salt
2-hydroxy-3-N-(2,3-dihydroxypropyl)naphthamide
2-hydroxy-3-N-hydroxyethyl-naphthamide
2-hydroxy-3-N,N-bis-(beta-hydroxyethyl)naphthamide
2-hydroxy-3-N-(beta-diethylaminoethyl)naphthamide, etc.

Among the dihydroxy naphthalene and amino-substituted hydroxy naphthalene couplers found to be eminently suitable for use in the practice of the present invention there may be mentioned for example, those which correspond to the following structural formula:

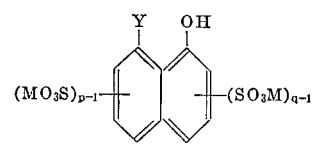

wherein M has the significance given above, $p$ and $q$ are integers of 1 or 2, their sum being at least 3, and Y represents hydroxyl, amino, acylamino, e.g., acetylamino, propionylamino, butyrylamino, benzoylamino, etc.; alkylamino, e.g., methylamino, dimethylamino, ethylamino, diethylamino, etc.; arylamino, e.g., phenylamino, diphenylamino, etc.

Specific representatives of coupling compounds encompassed by the above formula include without limitation the following:

1,8-dihydroxy-3,6-naphthalene disulfonic acid
1,8-dihydroxy-3,6-naphthalene disulfonic acid disodium salt
1,8-dihydroxy-naphthalene-3-sulfonic acid
1,8-dihydroxy-naphthalene-4-sulfonic acid
1-hydroxy-8-amino-naphthalene-2-sulfonic acid
1-hydroxy-8-amino-naphthalene-4-sulfonic acid
1-hydroxy-8-amino-naphthalene-6-sulfonic acid
1-hydroxy-8-amino-naphthalene-3-sulfonic acid
1-hydroxy-8-amino-naphthalene-5-sulfonic acid
1-hydroxy-8-acetylamino-naphthalene-3-sulfonic acid
1-hydroxy-8-propionylamino-naphthalene-4-sulfonic acid
1-hydroxy-8-benzoylamino-naphthalene-7-sulfonic acid
1-hydroxy-8-methylamino-naphthalene-5-sulfonic acid
1-hydroxy-8-dimethylethylamino-naphthalene-6-sulfonic acid
1-hydroxy-8-butyrylamino-naphthalene-5-sulfonic acid
1-hydroxy-8-phenylamino-naphthalene-4-sulfonic acid As examples of suitable water-solubilizing cations, i.e., substituent M in the foregoing formulae, particular mention may be made of alkali metal, e.g., sodium, potassium, etc.; ammonium; substituted ammonium wherein one or more of the hydrogen atoms is replaced by alkyl, hydroxyalkyl, etc.

With each of the aforedescribed classes of coupler compounds, the monosulfonic acid derivatives are in general preferred since the presence of more than one sulfonic acid group seems to correspondingly depress the coupling reaction rate thereby reducing the overall effective speed of the reproduction process.

The sensitizing compositions of the present invention may further contain one or more of the usual adjuncts commonly employed to promote stabilization, e.g., thiourea, thiosinamine and the like as well as compounds to retard precoupling such as citric acid, tartaric acid, boric acid and the like.

The components comprising the sensitizing composition may, prior to application to the base material, be dissolved in suitable solvents, such as water or mixtures of water and a lower alkanol such as methanol, ethanol, 1-propanol, etc.; glycols, such as ethylene glycol, dipropylene glycol and the like.

The base material to which the sensitizing composition is applied may be any of those conventionally employed in the art for such purposes. However, as will be readily appreciated, paper will ordinarily be preferred for the production of blueprint type copy. Other suitable base materials include for example, film-forming substances such as the cellulose esters, e.g., cellulose acetate, cellulose propionate, cellulose acetate propionate; film-forming synthetic polymer materials, e.g., polyethylene terephthalate, polyvinyl chloride, etc.

The following examples are given for purposes of illustration only and it is to be understood that the present invention is not restricted thereto.

EXAMPLE I

A sensitizing solution is prepared consisting of:

| | |
|---|---|
| Water _____ ml__ | 98 |
| Propylene glycol _____ ml__ | 2 |
| Citric acid _____ gm__ | 3 |
| 2-hydroxy-3-N-morpholinopropyl-naphthamide _gm__ | 1 |
| Caffeine _____ gm__ | 2 |
| 2,5-diethoxy-4-morpholine-benzenediazonium chloride _____ gm__ | 1 |
| Zinc chloride _____ gm__ | 2 |
| Thiourea _____ gm__ | 3 |

The above solution is then coated on a suitable paper base and dried. Following exposure to actinic light under a negative original, development is effected with ammonia vapors whereupon there is obtained a dense green-blue copy with white image lines having an exceptionally pure green-blue hue and excellent contrast. The aforedescribed procedure is repeated utilizing the above sensitizing composition but omitting the caffeine. A blue copy is obtained which is characterized by a readily detectable overall reddish tint.

In each of the following examples, the sensitizing composition of Example I is employed except for the substitution of the particular coupling compounds identified in Table I below. In each case, the amount of coupling compound employed is identical with the amount shown in Example I.

TABLE I
[Examples II–VIII]

| Example No. | Coupling Compound | Color Obtained Upon Development |
|---|---|---|
| II | 2,3-dihydroxy-naphthalene-6-sulfonic acid sodium salt. | Blue-green. |
| III | 2-hydroxy-3-N-(2,3-dihydroxypropyl)-naphthamide. | Do. |
| IV | 2-hydroxy-3-N-hydroxyethylnaphthamide. | Do. |
| V | 2-hydroxy-3-N,N-bis-(betahydroxyethyl)naphthamide. | Do. |
| VI | 2-hydroxy-3-N-(beta-diethylaminoethyl)naphthamide. | Do. |
| VII | 2-hydroxy-3-N-(tris-methylolmethyl)-naphthamide. | Do. |
| VIII | 2-hydroxy-3-naphthamide. | Do. |

In each of Examples II–VIII, the blue-green copy obtained exhibits a pure, vivid hue with clean, white image lines. Further, the colored areas were totally devoid of any reddish tint or other spurious coloration. In contradistinction, control samples prepared and processed in identical manner but omitting the caffeine possessed a highly objectionable reddish tint.

EXAMPLE IX

Example I is repeated except that the caffeine is replaced by an equivalent amount of theophylline. Following exposure and development, the results obtained in comparison with a control sample omitting the theophylline were comparable to those obtained in the preceding examples.

EXAMPLE X

Example I is repeated except that the caffeine is replaced by an equivalent amount of theobromine. Again, following exposure and development with a control sample omitting the theobromine, the results obtained were similar to those described in the foregoing examples.

EXAMPLE XI

A sensitizing solution is prepared consisting of the following ingredients:

| | |
|---|---|
| Water _____ ml__ | 98 |
| Ethanol _____ ml__ | 2 |
| Citric acid _____ gm__ | 3 |
| 1,8-dihydroxy-naphthalene-4-sulfonic acid _____ gm__ | 2 |
| 2,5-diethoxy-4-morpholinobenzenediazonium chloride _____ gm__ | 2 |
| Thiourea _____ gm__ | 3 |
| Caffeine _____ gm__ | 2 |

The above solution is coated on a paper base and dried. Following exposure to actinic light under a negative original, and development with ammonia vapors, there is obtained a dense, green-blue copy, the white image lines having an exceptionally pure green-blue hue and excellent contrast. A control sample prepared and processed in identical manner but omitting the caffeine yielded colored areas characterized by a readily detectable reddish tint.

EXAMPLE XII

Example XI is repeated except that the coupler employed is 1-hydroxy-8-amino-naphthalene-4-sulfonic acid. Following exposure and development, and a comparison with a control sample omitting the caffeine, the results obtained are similar to those described in Example XI.

EXAMPLE XIII

Example I is repeated except that the coupling compound employed is 1-hydroxy-8-acetylamino-naphthalene-4-sulfonic acid. Following exposure and development, there is obtained a greenish-blue copy of high density. However, a control sample prepared and processed in identical manner exhibits colored areas having an overall reddish tint.

Results similar to those described in the foregoing examples are obtained when the process described therein is repeated but employing in lieu of the specific diazo compounds exemplified, diazo derivatives of each of the following:

1-amino-4-(2,5-dibutoxymorpholino)benzene
1-amino-4-piperidino-benzene
2,5-dibutoxy-4-morpholino-benzenediazonium chloride
4-morpholino-benzenediazonium chloride
2,5-diethyl-4-morpholino-benzenediazonium chloride
2,5-diethoxy-4-piperidino-benzenediazonium chloride
2,5-diethoxy-4-piperazino-benzenediazonium chloride, etc.

The present invention has been disclosed with respect to certain preferred embodiments thereof and there will become apparent to persons skilled in the art various modifications, equivalents, or variations thereof which are intended to be included within the spirit and scope of this invention.

What is claimed is:

1. A two-component light-sensitive diazo sensitizing composition capable of forming in the non-exposed areas when subjected to alkaline development a pure blue to blue-green dyestuff image free of reddish tint, having therein as the diazo sensitizer, a light-sensitive compound comprising a diazo derivative of a para-phenylene diamine of the following structural formula formed by diazotizing the primary amino substituent:

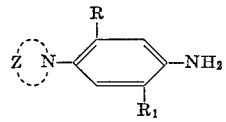

wherein Z represents the non-metallic atoms necessary to complete a heterocyclic nucleus selected from the group consisting of morpholine, thiomorpholine, piperidine and piperazine and wherein R and $R_1$ are selected from the group consisting of hydrogen, lower alkyl, and lower alkoxy and, as the coupler, an azo dye coupling component which yields, when coupled with the said diazo derivative, a pure blue to reddish-blue color, said coupler is selected from the group consisting of (a) naphthol acid amides, (b) dihydroxy naphthalene sulfonic acids and salts thereof and (c) amino-substituted, hydroxynaphthalene sulfonic acids and salts thereof and, said composition containing a xanthine compound.

2. A composition according to claim 1 wherein said azo dye coupling components is selected from the group consisting of (a) naphthoic acid amides, (b) dihydroxy naphthalene sulfonic acids and salts thereof and (c) amino-substituted, hydroxynaphthalene sulfonic acids and salts thereof.

3. A composition according to claim 2 wherein said xanthine comprises caffeine.

4. A composition according to claim 2 wherein said azo dye coupling component comprises 2-hydroxy-3-(N-morpholinopropyl)naphthamide.

5. A composition according to claim 2 wherein said azo dye coupling component comprises 2,3 - dihydroxynaphthalene-6-sulfonic acid sodium salt.

6. A composition according to claim 2 wherein said azo dye coupling component comprises 2-hydroxy-3-N-(2,3-dihydroxypropyl)naphthamide.

7. A composition according to claim 2 wherein said azo dye coupling component comprises 1 - hydroxy - 8-aminonaphthalene-4-sulfonic acid.

8. A composition according to claim 2 wherein said azo dye coupling component comprises 2-hydroxy-3-N,N-bis-(beta-hydroxyethyl)naphthamide.

9. A composition according to claim 1 wherein said diazo derivative comprises 2,5-diethoxy - 4 - morpholino-benzenediazonium chloride.

10. A light-sensitive diazotype material comprising a paper base coated with the composition of claim 1.

References Cited

UNITED STATES PATENTS

| | | | |
|---|---|---|---|
| 2,270,756 | 1/1942 | Kern | 96—91 XR |
| 2,298,444 | 10/1942 | Weissberger et al. | 96—91 |
| 2,494,906 | 1/1950 | Slifkin et al. | 96—49 XR |
| 2,617,726 | 11/1952 | Kessels | 96—75 |
| 3,016,298 | 1/1962 | Sanders et al. | 96—75 |
| 3,113,025 | 12/1963 | Bialczak | 96—91 |
| 3,186,845 | 11/1965 | Sus et al. | 96—91 |
| 3,248,220 | 4/1966 | Van Rhijn | 96—49 XR |
| 3,255,010 | 6/1966 | Sus et al. | 96—91 XR |

FOREIGN PATENTS

| | | |
|---|---|---|
| 55,598 | 10/1943 | Netherlands. |
| 60,285 | 11/1947 | Netherlands. |

OTHER REFERENCES

Van der Grinter, "The Photographic Journal," vol. 92B, April 1952, (pp. 43–48).

NORMAN G. TORCHIN, Primary Examiner

C. BOWERS, Assistant Examiner

U.S. Cl. X.R.

96—49